(12) United States Patent
Han et al.

(10) Patent No.: US 11,963,215 B2
(45) Date of Patent: Apr. 16, 2024

(54) RESOURCE UNIT ASSIGNMENT FOR SELECTIVE FADING

(71) Applicant: Hewlett Packard Enterprise Development LP, Houston, TX (US)

(72) Inventors: Jianpo Han, Beijing (CN); Hongli Zhang, Beijing (CN); Qiang Zhou, Sunnyvale, CA (US); Mohd Shahnawaz Siraj, San Jose, CA (US); Andre Beaudin, Montreal (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 220 days.

(21) Appl. No.: 17/512,121

(22) Filed: Oct. 27, 2021

(65) Prior Publication Data

US 2023/0128560 A1 Apr. 27, 2023

(51) Int. Cl.
*H04W 72/543* (2023.01)
*H04W 72/0453* (2023.01)

(52) U.S. Cl.
CPC ..... *H04W 72/543* (2023.01); *H04W 72/0453* (2013.01)

(58) Field of Classification Search
CPC .. H04W 72/543; H04W 72/0453; H04L 5/006
See application file for complete search history.

(56) References Cited

U.S. PATENT DOCUMENTS

| 6,301,616 | B1 | 10/2001 | Pal et al. |
| 8,005,479 | B2 | 8/2011 | Meiyappan |
| 9,820,280 | B2 | 6/2017 | Ellinikos et al. |
| 9,788,321 | B2 | 10/2017 | Wijetunge et al. |
| 9,854,597 | B2 | 12/2017 | Chen |
| 10,528,379 | B2 | 1/2020 | Kristiansson et al. |
| 2011/0154355 | A1 | 6/2011 | Becker et al. |
| 2017/0103039 | A1 | 4/2017 | Shamis et al. |
| 2017/0196010 | A1* | 7/2017 | Matsuo ............... H04W 72/542 |
| 2017/0373789 | A1* | 12/2017 | Huang ............... H04L 1/0003 |
| 2019/0007978 | A1 | 1/2019 | Tsodik et al. |
| 2019/0215842 | A1* | 7/2019 | Silverman ........... H04W 72/542 |
| 2019/0289634 | A1 | 9/2019 | Tsodik et al. |
| 2021/0075580 | A1* | 3/2021 | Thubert ............ H04W 72/0453 |
| 2022/0141825 | A1* | 5/2022 | Malladi ................ H04W 24/10 370/235 |

FOREIGN PATENT DOCUMENTS

| CN | 113498175 A | * | 10/2021 | ........ H04W 72/0453 |
| TW | 202133663 A | * | 9/2021 | ........... H04B 7/0452 |

* cited by examiner

*Primary Examiner* — Yu-Wen Chang

(74) *Attorney, Agent, or Firm* — Hewlett Packard Enterprise Patent Department

(57) ABSTRACT

Implementations of the present disclosure relate to resource unit (RU) assignment to combat frequency selective fading. A method comprises determining, at an access point (AP), a plurality of channel qualities of a plurality of resource units (RUs) for a client. The plurality of RUs are configured to be available for communications with a plurality of clients comprising the client. The method further comprises determining, from the plurality of RUs, a target RU for the client based at least in part on the plurality of channel qualities. The target RU is to be used by the client for a following transmission with the AP. A target RU with good channel quality will be assigned to the client, thus the transmission and overall system performance will be enhanced.

20 Claims, 10 Drawing Sheets

RESOURCE UNIT ASSIGNMENT FOR SELECTIVE FADING

BACKGROUND

Wireless communication networks such as wireless local area network (WLAN) are capable to provide various communication services such as voice, video and messaging for a plurality of clients. In the wireless communication networks, an access point (AP) may provide network connectivity to a plurality of clients through a plurality of resource units (RUs). The clients may use the plurality of RUs to perform communications with the AP. As the number of served clients increases and different clients locating at different locations may perceive different RU channel qualities, it becomes more complex to assign the plurality of RUs to different clients. It is desired to assign a RU with a good channel quality for each client.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

In wireless communication networks, an AP may provide network connectivity to a plurality of clients by designating or allocating a plurality of RUs for the plurality of clients to perform transmission. Example implementations of the present disclosure relate to assigning RU(s) of the AP to the client(s) to perform communications with the AP.

Figure 1:
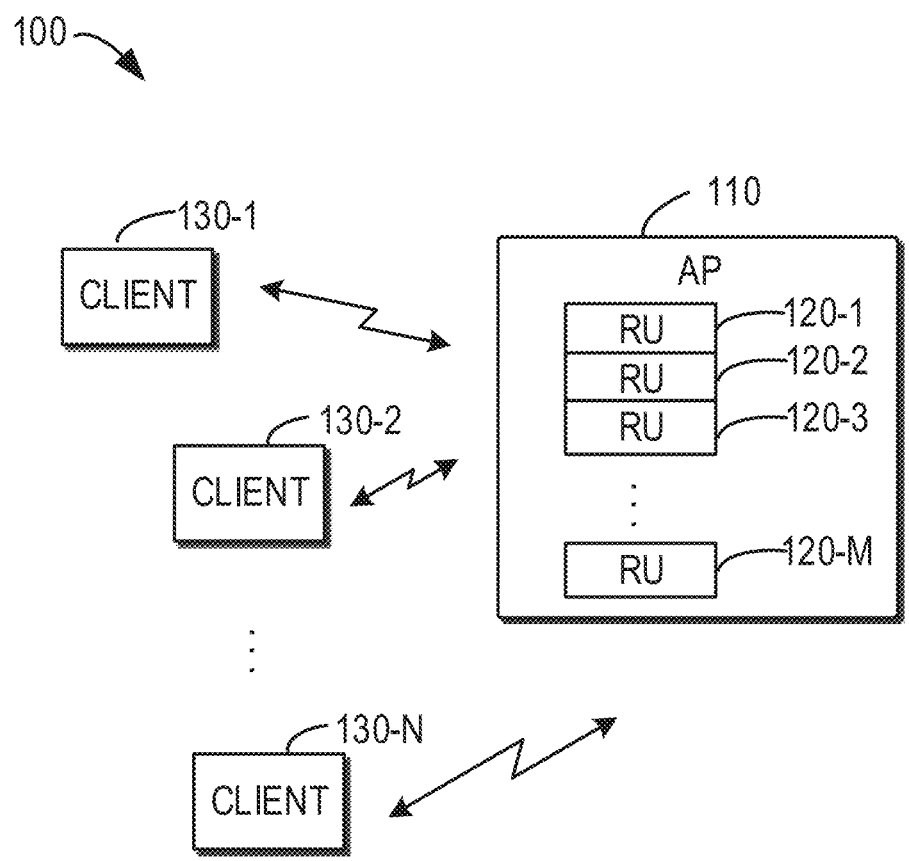
FIG. 1 illustrates a block diagram of an example communication environment in which example implementations of the present disclosure can be implemented.

FIG. 1 illustrates an example environment 100 in which example implementations of the present disclosure can be implemented. The example environment 100 may be implemented as a part of a wireless communication network such as a WLAN. The example environment 100 includes an AP 110 and a plurality of clients including client 130-1, client 130-2, . . . , client 130-N. The clients 130-1, 130-2, . . . , 130-N may be collectively referred to as "clients 130" or individually referred to as a "client 130". A plurality of clients 130 may transmit to or receive from the AP 110 at the same time by sharing available bandwidth.

The client 130 may also be referred to as a user device or a station (STA). The client 130 is any type of mobile device, fixed device, or portable device including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof.

The AP 110 may be any suitable device that allows one or more clients 130 to connect to the wireless communication network in the example environment 100. As used herein, the AP 110 may comprise, be implemented as, or known as a Radio Router, Radio Transceiver, switch, Wi-Fi hotspot device, Basic Service Set (BSS), Extended Service Set (ESS), Radio Base Station (RBS), or some other terminology.

Communications in the example environment 100 may operate according to the wireless communication protocols such as Institute of Electrical and Electronic Engineers (IEEE) 802.11 standards, Wi-Fi Alliance Specifications), or any other wireless communication standards. The IEEE 802.11 standards may include the IEEE 802.11ax standard (also referred to as Wi-Fi 6), or any other wireless communication standards.

In the example environment 100, Orthogonal Frequency Division Multiple Access (OFDMA) is used to divide of subcarriers into a plurality of RUs. For the purpose of illustration, in FIG. 1, the subcarriers used in communication with the AP 110 may be divided into RU 120-1, RU 120-2, RU 120-3, . . . , RU 120-M. Those RUs may be collectively referred to as "RUs 120" or individually referred to as a "RU 120". The term of "RU" used hereinafter refers to a resource unit used in the wireless communication network for communication, and the RU may denote a group of subcarriers having a certain bandwidth.

As a specific example, in some OFDMA-based communication network such as the IEEE 802.11.ax, subcarrier spacing is 78.125 kHz or 312.5 kHz or other suitable frequency bandwidth. When subdividing a communication channel of a full bandwidth such as 20 MHz, 40 MHz or any other suitable bandwidth, the AP 110 may be able to designate the number of subcarriers in a RU for communication, for example 26, 52, 106, or 242 subcarriers in a RU. For the purpose of illustration, taking the full bandwidth of 20 MHz and the subcarrier spacing of 78.125 kHz for example, when grouping a number of 26, 52, 106, or 242 subcarriers into a RU, the frequency bandwidth of the RU equates roughly to 2 MHz, 4 MHz, 8 MHz, or 20 MHz, respectively. The RU comprising a number of 26, 52, 106, or 242 subcarriers is referred to as RU 26, RU 52, RU 106 or RU 242, respectively. The number of subcarriers in each RU may be referred to "RU size" of the RU. For a certain channel of a certain full bandwidth, RU size of a RU is associated with the frequency bandwidth of the RU.

The AP 110 may specify the number of RUs with different RU sizes within each channel, for example 9 RUs of RU 26, 5 RUs of RU 52, 4 RUs of RU 26 and 2 RUs of RU 52, or any other numbers of RUs of different RU size. The AP may also specify the number of subcarriers in each RU or dictate the RU size of each RU. In a wireless communication network, the plurality of RUs 120 may be of a same RU size (that is, each RU having the same number of subcarriers) or of different RU sizes (that is, each RU having different numbers of subcarriers).

It is to be understood that the value of full bandwidth, the value of subcarrier spacing, the number of subcarriers in each RU, and the number of RUs is only for the purpose of illustration without suggesting any limitations. The communication channel may be of a broader or a narrower full bandwidth, the subcarrier spacing may be broader or narrower, the number of subcarriers in each RU may be various, and the number of RUs may vary as well.

It is to be understood that the number of AP, RUs and clients illustrated in FIG. 1 is only for the purpose of illustration without suggesting any limitations. The example environment 100 may include any suitable number of AP, RUs and clients configured for implementing implementations of the present disclosure.

The wireless communication environment is typically a multipath environment which comprises numerous obstacles, buildings and other objects in the environment. Time dispersion such as diffraction, reflection and scattering due to multipath may lead to frequency selective fading which degrades the performance of the channel. As a result, for different clients locating at different locations, some subcarrier signals will be enhanced while some subcarrier signals may be weakened. Thus, the transmission rate of the client is often limited by the weakest subcarrier signal strength in the RU used by the client. Low subcarrier signal strength will even cause transmission errors.

Conventionally, the AP allocates RU(s) to client(s) without considering the weakest subcarrier signal strength in the RU(s) allocated to the client(s). Rather, the AP simply considers the average subcarrier signal strength in the RU. Therefore, when the client located as a location where the client perceives the weakest subcarrier signal strength in the RU, the transmission performance of the client will be reduced due to the frequency selective fading. Therefore, it is desired to enhance the transmission performance of the client by assigning a RU with good subcarrier signal strength for the client for transmission.

Various example implementations of the present disclosure propose a more efficient way to assign good RU(s) for client(s) based on channel qualities of the RU(s) for the client(s). Specifically, different clients a wireless communication network may perceive different channel qualities from the RUs. For example, a client may perceive a good channel quality from one RU but perceive a bad channel quality from another RU. Similarly, one RU with a good channel quality for one client may be bad for another client. According to the example implementations of the present disclosure, the AP can determine a target RU for a particular client based on a plurality of channel qualities of the plurality of RUs for the client. The AP then assign the client with the target RU for a following transmission with the AP.

By allocating a target RU with a good channel quality for the client, it may improve the transmission performance and reliability between the client and the AP and reduce the transmission errors. In addition, by assigning the plurality of RUs to a plurality of clients in consideration of the respective channel quality of each RU, it may further improve the overall system performance and bring competitive advantage.

Some example implementations of the present disclosure will be discussed in detail below with reference to other figures.

Figure 2:
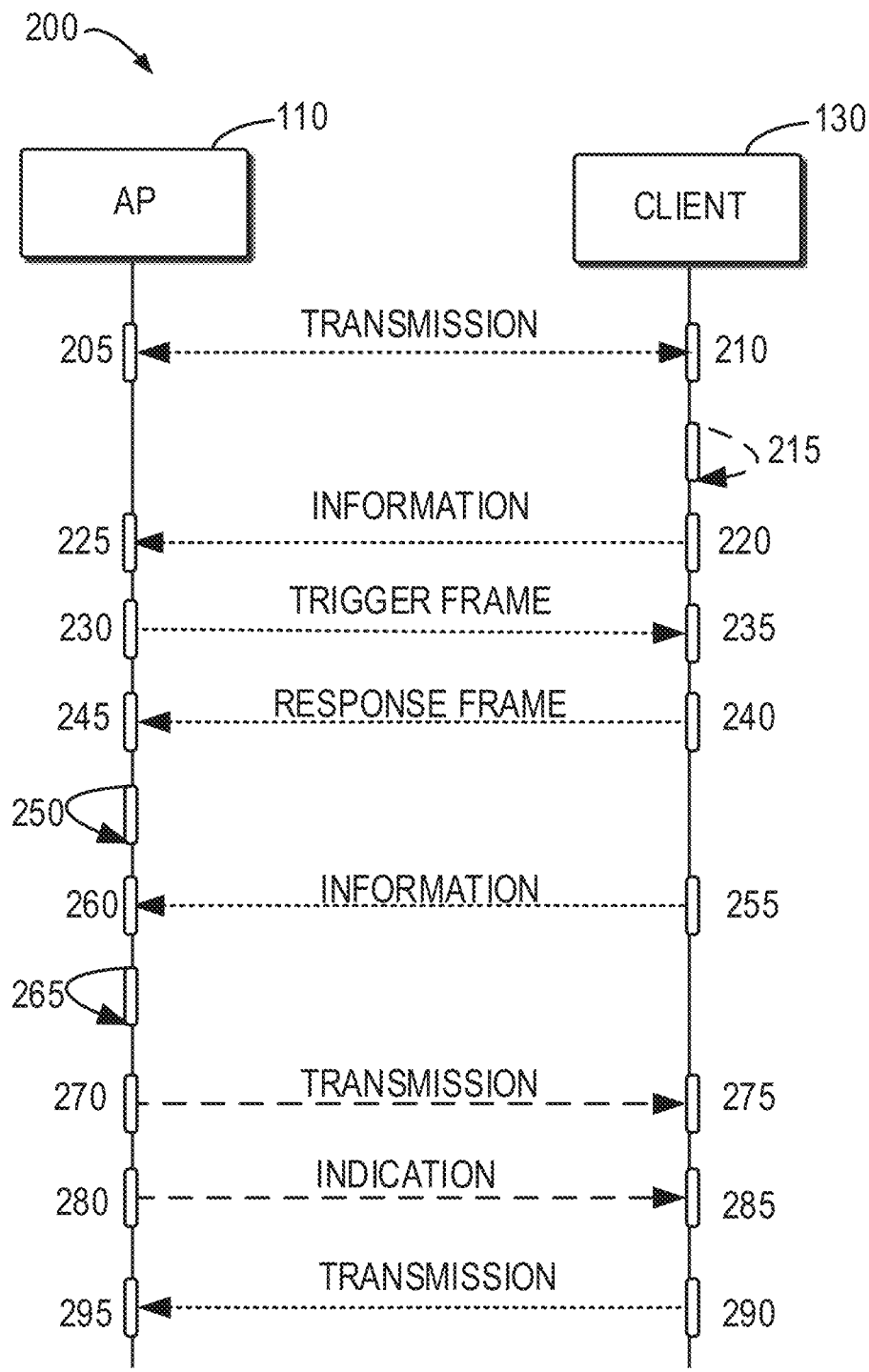
FIG. 2 illustrates a signaling flow for assigning a RU for a client in accordance with some example implementations of the present disclosure.

FIG. 2 illustrates a signaling flow 200 for RU assignment for a client in accordance with some example implementations of the present disclosure. For the purpose of discussion, the signaling flow 200 will be described with reference to FIG. 1, to discuss example implementations of the RU assignment between the AP 110 and the client 130. It is to be understood that although one client is shown in FIG. 2, when assigning the plurality of RUs to more than one client, it may use a process similar to the process described with respect to the signaling flow 200 to determine target RUs for the more than one client.

As briefly discussed above, the AP 110 determines a target RU for the client 130 based on a plurality of channel qualities of the plurality of RUs 120 for the client 130. The plurality of RUs 120 are configured to be available for communications with the plurality of clients 130 comprising the client 130. As mentioned above, each RU 120 comprises a group of subcarriers. The channel quality of the RU 120 may be determined as the weakest subcarrier's channel quality of the group of subcarriers comprised in the RU.

There are a variety ways to determine the plurality of channel qualities. In some implementations, transmissions such as non-beamformed transmissions may be performed 205/210 between the AP 110 and the client 130 before the RU assignment. Those transmissions before the RU assignment may be referred to as historical transmissions which are performed by the client 130 using the plurality of RUs 120. The client 130 may determine 215 a plurality of channel qualities such as received signal strength indications (RSSIs) or signal noise ratio (SNR) of the plurality of RUs 120 based on those historical transmissions.

After that, the client 130 may transmit 220, to the AP 110, information indicating the plurality of channel qualities. For example, the information may be transmitted to the AP 110 via physical layer (PHY). In response of receiving 225 the information such as receiver PHY descriptors/registers from the client 130, the AP 110 then determines 250 the plurality of channel qualities of the plurality of RUs 120 for the client 130. This kind of channel qualities determination passively collects RSSI bitmap of uplink non-beamforming frames.

Alternatively, in some implementations, the AP 110 may actively probe the client 130. Specifically, in the signaling flow 200, the AP 110 may transmit 230 a trigger frame to the client 130 using the plurality of RUs 120. In response to receiving 235 the trigger frame from the AP 110, the client 130 may transmit 240 a response frame to the trigger frame using the plurality of RUs to the AP 110. For example, the response frame may be a single user (SU) frame using full-bandwidth rate, such as 20 MHz.

After receiving 245 the response frame, the AP 110 determines 250 the plurality of channel qualities based on the response frame. For example, the AP 110 may determine an energy distribution over the plurality of RUs during reception 245 of the response frame. Then the AP 110 determines 250 the plurality of channel qualities based on the energy distribution.

Specifically, the AP 110 may collect Fast Fourier Transmission (FFT) data of the response frame such as the SU frame using full-bandwidth rate. The FFT data (frequency domain) may indicate the energy distribution among each subcarrier. RSSI of each subcarrier may be calculated as square root of I and Q (i.e., sqrt (I, Q)). I and Q respectively refer to the real part and imaginary part of the FFT data. For each RU 120, the AP 110 may determine 250 the weakest subcarrier's RSSI as the channel quality for the RU 120.

A variety ways to determine 250 the plurality of channel qualities have been described above. In some implementations, the AP 110 may determine 250 the plurality of channel qualities periodically. By doing so, the AP 110 may update the plurality of channel qualities for a moving client 130.

After determining 250 the plurality of channel qualities, the AP 110 determines 265 a target RU for the client 130 based at least in part on the plurality of channel qualities. In some implementations, the AP 110 may determine 265 a target RU for the client 130 from the plurality of RUs 120 based on comparisons between the plurality of RUs and a threshold quality set for the client 130. For example, the threshold quality set for the client 130 may be determined based on an average channel quality of the plurality of channel qualities.

Figure 3:
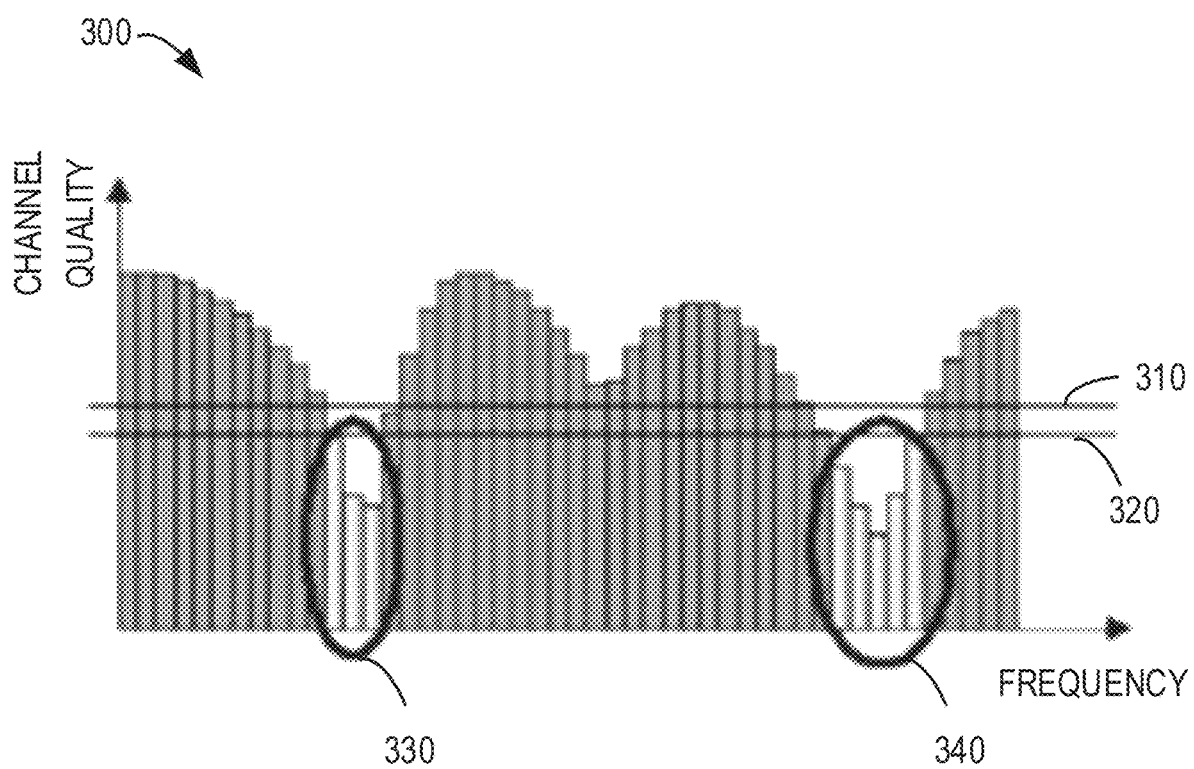
FIG. 3 illustrates an example diagram showing channel qualities over different subcarriers for a client.

FIG. 3 illustrates an example diagram 300 showing channel qualities over different subcarriers for the client 130. An average channel quality 310 such as average SNR may be calculated. In some examples, the threshold quality may be set as the average channel quality 310. Alternatively, in some examples, the threshold quality may be set as around the average channel quality, for example by subtracting a predefined offset value from the average channel quality 310, as shown by channel quality 320. It should be appreciated that the threshold quality may be set according to applications and the scope of the present disclosure is not limited in this regard.

Subcarriers in the groups 330 and 340 having channel qualities below the channel quality 320 (i.e., the threshold quality) may be referred as bad subcarriers for the client 130. RUs comprising one or more bad subcarriers may be referred to as bad RUs for the client 130. The AP 110 will not determine a bad RU to the client 130 based on the comparisons between the plurality of RUs and a threshold quality set for the client 130. Instead, the AP 110 may determine a good RU whose subcarriers having channel qualities exceeding the threshold quality as the target RU for the client 130.

In some implementations, the AP 110 determines 265 a target RU for the client 130 having a channel quality exceeding the threshold quality and a frequency bandwidth equal to a threshold frequency bandwidth. Alternatively, the AP 110 determines 265 a target RU for the client 130 having a channel quality exceeding the threshold quality and a frequency bandwidth equal to or exceeding the threshold frequency bandwidth. The term of "frequency bandwidth" may be also referred to as "frequency width", "bandwidth" or "width". In some implementations, the threshold frequency bandwidth may be predefined or preconfigured by the AP 110.

Alternatively, in some implementations, the client 130 may transmit 255 information related to a RU size requirement to the AP 110 for example via the PHY. The RU size requirement indicates the threshold frequency bandwidth required by the client 130. For example, the RU size requirement may be RU 52 which indicates a threshold frequency bandwidth of 4 MHz. For another example, the RU size requirement may be RU 26 which indicates a threshold frequency width of 2 MHz. It should be appreciated that the threshold frequency bandwidth may be set according to applications and the scope of the present disclosure is not limited in this regard.

In some implementations, in accordance with a determination that a single RU of the plurality of RUs 120 has a channel quality exceeding the threshold quality, the AP 110 may determine 265 the single RU to be the target RU for the client 130. In the case that there is no RU having a channel quality exceeding the threshold quality, the AP 110 may optionally choose a RU with a channel quality around the threshold quality (or a little less than the threshold quality) to be the target RU for the client 130.

In addition or alternatively, in accordance with a determination that more than one client RU of the plurality of RUs 120 has a channel quality exceeding the threshold quality, the AP 110 may determine a candidate RU set for the client 130 from the more than one RU. The candidate RU set comprises at least one RU. Then the AP 110 may select a candidate RU from the candidate RU set as the target RU for the client 130.

In some implementations, in determining the candidate RU set, the AP 110 may select at least one of the more than one RU having a frequency bandwidth equal to or exceeding a threshold frequency bandwidth to form the candidate RU set. As discussed above, the frequency bandwidth may be predefined or preconfigured by the AP 110, or may be indicated by the client 130.

After determining the candidate RU set, the AP 110 may determine the number of candidate clients for each RU in the candidate RU set. A respective channel quality of the RU for a candidate client exceeds a threshold quality set for the candidate client. In some implementations, the threshold quality set for each candidate client may be collectively set to average channel quality for all of the candidate clients. Otherwise, the threshold quality set for each candidate client may be individually set to average channel quality for the candidate client. The AP 110 may select a particular RU in the candidate RU set with the least number of candidate clients as the target RU for the client 130. That is, the number of candidate clients for the particular RU is less than or equal to the numbers of candidate clients for other RUs in the candidate RU set.

After determining 265 the target RU for the client 130, the AP 110 may transmit 270 a following transmission to the client 130 using the target RU.

Information regarding the RU assignment for the client 130 may be included in physical header of OFDMA frames. The client 130 may receive 275 the transmission from the AP using the target RU.

In addition or alternatively, the AP 110 may transmit 280, to the client 130, indication information indicative of the target RU. For example, the AP 110 may transmit 280 a trigger frame including the indication information to the client 130. After receiving 285 the indication, the client 130 may transmit 290 a following transmission to the AP 110 using the target RU. Then the AP 110 may receive 295 this transmission from the client 130. It is to be understood that one or more following transmission may be performed between the AP 110 and the client 130 using the target RU.

As previous discussed, the AP 110 may determine 250 the plurality of channel qualities for the client 130 periodically. Similarly, the AP 110 may also determine 265 the target RU for the client 130 periodically.

Figure 4:
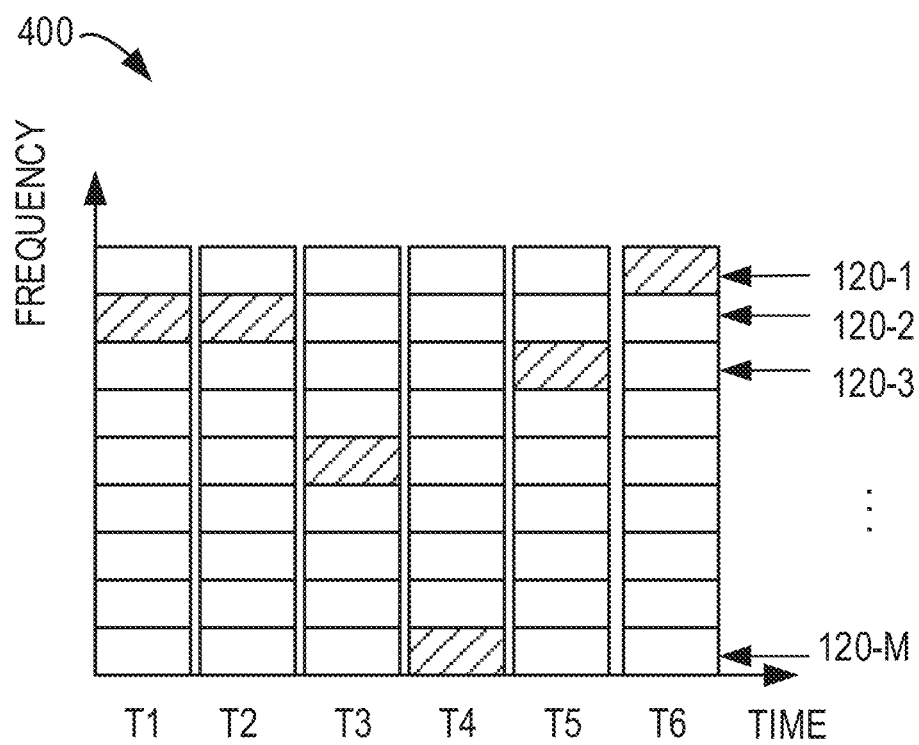
FIG. 4 illustrates an example diagram showing RU assignment for a client during a period of time.

FIG. 4 illustrates an example diagram showing RU assignment 400 for the client 130 during a period of time. As shown in FIG. 4, the AP 110 groups subcarriers in a channel with a full bandwidth into a plurality of RUs 120 (for example, RUs 120-1, 120-2, 120-3, . . . , 120-M). For example, a group of subcarriers with the highest frequencies may be grouped into a RU 120-1, a group of subcarriers with the second highest frequencies may be grouped into a RU 120-2, a group of subcarriers with the third highest frequencies may be grouped into a RU 120-3, and so on. Then, a group of subcarriers with the lowest frequencies may be grouped into a RU 120-M. The AP 110 may allocate the plurality of RUs 120 to the client 130 periodically. The period of the RU assignment may be predefined by the AP 110 or may be dynamically adjusted during communications with the client 130. The client 130 may perform transmission with the AP 110 using the periodically assigned RU.

As illustrated in FIG. 4, at different time periods, the AP 110 may assign different RUs 120 to the client 130. Taking client 130-1 for example, at the first and second time periods (i.e., at T1 and T2 shown in FIG. 2), the RU 120-2 is assigned to the client 130-1 for transmission with the AP 110. Similarly, at other time periods, different RUs such as RU 120-1 (at T6), RU 120-3 (at T5), RU 120-M (at T4) and another RU (at T3) are assigned to the client 130-1 for transmission with the AP 110. It is to be understood that FIG. 4 is only for the purpose of illustration without suggesting any limitations.

By doing so, for a moving client, the AP may periodically assign a target RU with good channel quality to the client. It may ensure the reliability and performance of transmissions between the AP and the client even if the client is moving all the time.

By determining a target RU with a good channel quality for the client, the client may avoid using a bad RU for transmission. When determining the target RU, the AP may prefer a flat RU rather than a RU with higher variance (which is possibly has a lower weakest subcarrier). Therefore, the present RU assignment may also be referred to as flat RU assignment for selective fading. With the aid of the flat RU assignment for selective fading, it will mitigate the influence of the selective fading, and improve reliability and performance of transmissions such as OFDMA transmission between the AP and the client. It may also improve radio frequency (RF) differentiation between different clients and also brings competitive advantages.

Several example implementations regarding assigning a target RU for a client have been discussed above with respect to FIGS. 2-4. Additional example implementations regarding assigning a plurality of RUs to a plurality of clients based on channel qualities will be described with respect to FIGS. 5-6 below.

Figure 5:
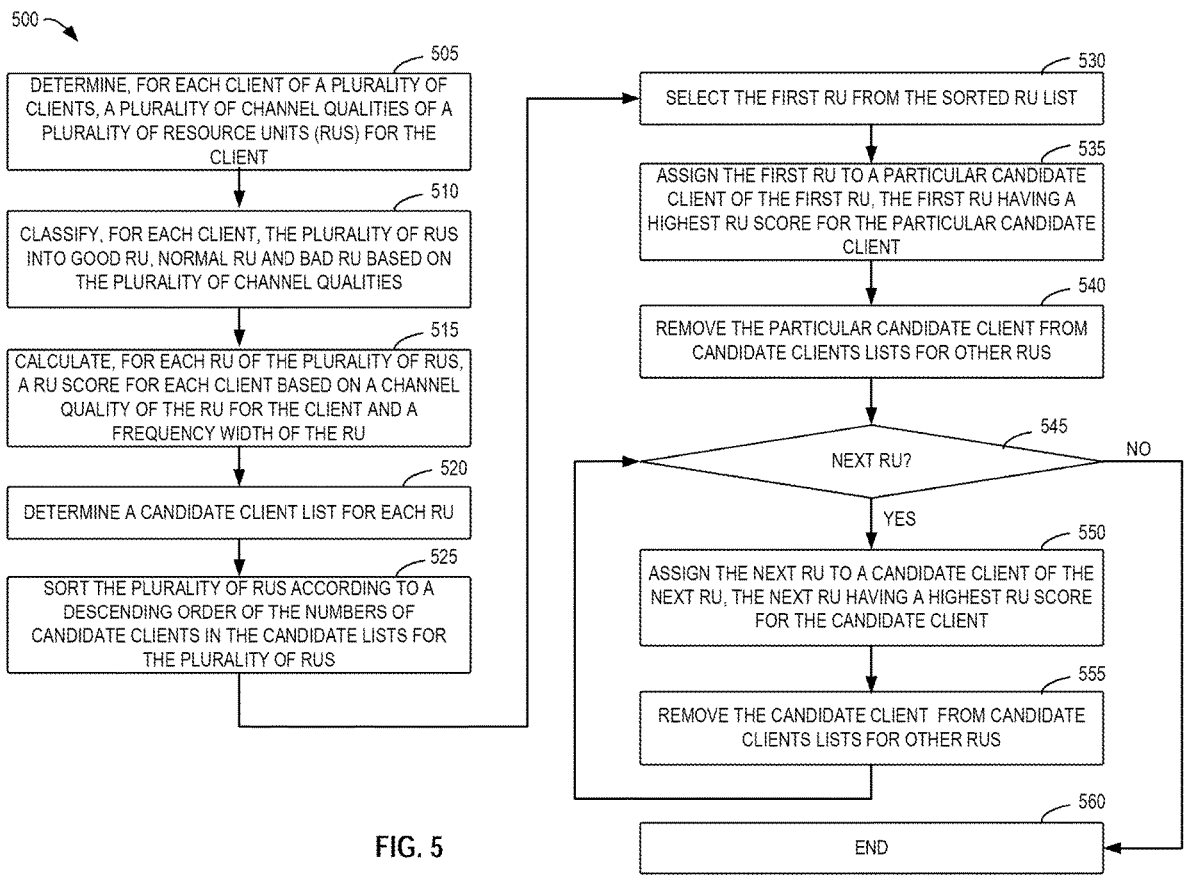
FIG. 5 illustrates a flowchart of a method for assigning a plurality of RUs to a plurality of clients in accordance with some example implementations of the present disclosure.

FIG. 5 illustrates a flowchart of a method 500 for assigning the plurality of RUs 120 to the plurality of clients 130 in accordance with some example implementations of the present disclosure. For the purpose of discussion, the method 500 will be described with reference to FIG. 1, to discuss example implementations of the RU assignment between the plurality of RUs 120 and the plurality of clients 130 connected to the AP 110. The method 500 can be carried out by the AP 110 according to the implementations described herein.

While only some blocks are shown in the method 500, the method 500 may comprise further operations described herein. While the method 500 is shown and described as being a series of acts that are performed in a sequence, it is to be understood and appreciated that the method is not limited by the order of the sequence. For example, some acts may occur in a different order than what is described herein. In addition, an act can occur concurrently with another act. Further, in some implementations, not all acts may be required to implement the method described herein.

Some implementations regarding assigning a target RU for a client have been described with respect to FIG. 2. By contrast, the method 500 uses a more complex process to assigning a plurality of RUs to a plurality of clients. The method 500 taking channel qualities of each client using each RU into considerations, thus can ensure each client may be assigned with a RU with good channel quality.

At 505, the AP 110 determines, for each client of the plurality of clients 130, a plurality of channel qualities of the plurality of RUs 120 for the client. The AP 110 may use the processes described with respect to FIG. 2 or other suitable process to determine the plurality of channel qualities for each client. For example, a channel quality of a RU for the client may be determined as the weakest subcarrier's RSSI of the group of subcarriers comprised in the RU.

At 510, the AP 110 may classify, for each client, the plurality of RUs into good RU, bad RU and optionally normal RU based on the plurality of channel qualities. If the channel quality of a particular RU is higher than a threshold quality such as an average RSSI, or in otherwords, RSSI of all subcarriers of the particular RU are above the average RSSI, then the particular RU is a good RU. Similarly, if the channel quality of a particular RU is lower than the threshold quality such as the average RSSI, or in other words, RSSI of partial subcarriers of the particular RU are lower than the average RSSI, then the particular RU is a bad RU. Optionally, if the channel quality of a particular RU is around the threshold quality such as the average RSSI or a little lower than the threshold quality, or in other words, RSSI of all subcarriers of the particular RU are around the average RSSI or a little lower than the average RSSI, then the particular RU is a normal RU. It is to be understood that the threshold quality may be determined based on similar processes described above with respect to FIG. 2.

In some implementations, after grouping the plurality of RUs 120 into different RUs for each client 130, the AP 110 may randomly select a target RU from the good RUs for each client 130. In addition or alternatively, in some implementations, the AP 110 may perform further operations to determine a target RU for each client 130. The further operations may comprise the following operations shown in FIG. 5, which will be described in details below.

At 515, the AP 110 may calculate, for each RU of the plurality of RUs 120 available for communications with the plurality of clients 130, a RU score for each client 130 based on a channel quality of the RU for the client 130 and a frequency bandwidth of the RU. For example, a higher channel quality will correspond to a higher RU score. Similarly, a wider frequency bandwidth will correspond to a higher RU score. The RU score may be simply determined using a multiplication operation of the channel quality and the frequency bandwidth, or otherwise using any other suitable operations. Table 1 below illustrates an example table for RU scores for each client and for each RU.

TABLE 1

RU Scores Table

|  | RU Size | RU 0 | RU 1 | RU 2 | Average |
| --- | --- | --- | --- | --- | --- |
| Client 1 | 1 | 10 | 8 | 8 | 8.7 |
| Client 2 | 1 | 7 | 3 | 6 | 5.3 |
| Client 3 | 1 | 4 | 3 | 6 | 4.3 |
| Sum |  | 21 | 14 | 20 |  |

Table 1 shows the RU score of a client for a given RU. For example, the RU score of Client 1 for RU 1 is 8. Table 1 also shows a RU size requested by the client or predefined by the AP. The RU size may represent a threshold frequency bandwidth. The AP may assign a RU for the client based in part on the threshold frequency bandwidth. For example, the AP may assign a RU with a frequency bandwidth equal to the threshold frequency bandwidth or optionally exceeding threshold frequency bandwidth for the client. For example, RU size with the value 1 representing RU 26 with a 2 MHz frequency bandwidth, RU size with the value 2 (not shown) representing RU 52 with a 4 MHz frequency bandwidth, and so on. The "Average" column in Table 1 also shows the average channel quality score (such as average RSSI score) across all the subcarriers which may be used as the threshold quality for the client. A lower average score indicates a farther client.

The AP 110 may determine whether a RU is a good RU for the client based on the delta between the RU score and the average score. For example, RU 0 is a good RU for Client 2 because the delta between the RU score 7 and the average score 5.3 (which equals to 1.7) is above 0. For another example, RU 1 is a bad RU for Client 2 as the delta between the RU score 3 and the average score 5.3 (which is equal to −2.3) is below 0. For a further example, RU 0 is a normal RU for Client 3 because the delta between the RU score 4 and the average 4.3 (which is equal to −0.3) is around 0.

After that, at 520, the AP 110 may determine a candidate client list for each RU. A candidate client (also referred to as a good candidate client) has a RU score for the RU higher than the average score for the client. For example, in the example of Table 1, for RU 0, the candidate client list may comprise Client 1 and Client 2. Similarly, for RU 1, the candidate client list may comprise Client 1; and for RU 2, the candidate client list may comprise Client 1 and Client 3. In addition or alternatively, a client having a RU score for the RU around the average score for the client may be considered as a normal candidate client. Then, the candidate client list for each RU may be expanded. For example, RU 0 further has a normal candidate client, i.e., Client 3, and RU 2 further has a normal candidate client, i.e., Client 2.

At block 525, the AP 110 may sort the plurality of RUs according to a descending order of the numbers of candidate clients in the candidate clients lists for the plurality of RUs. For example, in the example of Table 1, the numbers of candidate clients for the plurality of RUs may be shown in the following Table 2.

TABLE 2 candidate client numbers for the RUs

|  | RU Size | RU 0 | RU 1 | RU 2 | Average |
|---|---|---|---|---|---|
| Client 1 | 1 | 10 | 8 | 8 | 8.7 |
| Client 2 | 1 | 7 | 3 | 6 | 5.3 |
| Client 3 | 1 | 4 | 3 | 6 | 4.3 |
| Sum. |  | 21 | 14 | 20 |  |
| Candidate No. (good + normal) |  | 2 + 1 | 1 | 2 + 1 |  |

As shown in Table. 2, RU 0 has 2 good candidate clients and 1 normal candidate client; RU 1 only has 1 good candidate client, while RU 2 has 2 good candidate clients and 1 normal candidate client. Then, the AP 110 may sort the plurality of RUs to be {RU 1; RU 0; RU 2} or {RU 1; RU 2; RU 0}.

At block 530, the AP 110 may select the first RU from the sorted RU list. In the example of Table. 2, the first RU is RU 1. After that, at block 535, the AP 110 may assign the first RU to a particular candidate client of the first RU. The first RU has a highest RU score for the particular candidate client. That is, the AP 110 may assign the RU 1 to a particular candidate client of the RU 1. As shown in Table. 2, the RU 1 only has one good candidate client, that is Client 1. In this case, the AP 110 may assign the RU 1 to the Client 1.

Then, at block 540, the AP 110 may remove the particular candidate client from candidate clients lists for other RUs. Also in the example of Table. 1 and Table. 2, the updated candidate clients list of RU 0 comprises one good candidate client (Client 2) and one normal candidate client (Client 3); while the updated candidate clients list of RU 2 comprises one good candidate client (Client 3) and one normal candidate client (Client 2).

At block 545, the AP 110 may determine whether the sorted RU list has a next RU. In accordance with a determination that there is a next RU, the method 500 may proceed to block 550. At block 550, the AP 110 may assign the next RU to a candidate client of the next RU. The next RU has a highest RU score for the candidate client. As the RU 0 and RU 2 have the same numbers of candidate clients, the AP 110 may random choose a next RU, for example the RU 0. For RU 0, it has a good candidate client (i.e., Client 2) with a RU score 7 and a normal candidate client (i.e., Client 3) with a RU score 4. Then, the AP 110 may assign the RU 0 to Client 2 because RU 0 has a highest RU score for the Client 2.

At block 555, the AP may remove the candidate client from candidate clients lists for other RUs. For example, the AP 110 may remove Client 2 from the candidate client list for RU 2. After that, the candidate client list for RU 2 comprises one good candidate client, that is, Client 3. After block 555, the method 500 will return back to block 545.

Similarly, the AP 110 may repeat blocks 545, 550 and 555 for RU 2. That is, the AP 110 may determine that a next RU is RU 2, assign RU 2 to Client 3, and remove Client 3 from candidate clients lists for other RUs. In some examples, if RU 2 for example has no good candidate clients but only normal candidate client(s), the AP 110 may assign RU 2 to the normal candidate client with a highest RU score.

In accordance with a determination at block 545 that there is no next RU, the method 500 will proceed to block 560. At block 560, the method 500 ends. That is, the AP 110 completes with the RUs assignment to the plurality of clients 130. Finally, in the example of Table. 1 and Table 2, RU 1 is assigned to Client 1, RU 0 is assigned to Client 2, and RU 2 is assigned to Client 3. In this example, all clients get good RUs.

It is to be understood that the method 500 may be performed periodically. By performing the method 500 periodically, it may ensure moving clients may also be assigned with a good or normal RU.

In some example implementations, if the AP 110 may not assign a good or normal RU to each client by performing the above processes 530-555 once, then the AP 110 may start the next round of the processes 530-555. In the next round, the AP 110 may not always select the best candidate for the RU, but also consider the second or third best candidate for the RU. For example, in the first round, the AP may select $\{1^{st}, 1^{st}, 1^{st}, x\}$ candidate clients for {RU 0, RU 1, RU 2, RU 3} and finally cannot find a good or normal candidate client for RU 3. The AP 110 may perform a second round, in the second round, the AP 110 may select $\{1^{st}, 1^{st}, 2^{nd}, x\}$ candidate clients for these RUs. If still fails to find a good or normal candidate client for RU 3, then the AP 110 may perform a further round. Finally, at round N, the AP 110 may succeed to assign $\{1^{st}, 1^{st}, 3^{rd}, 2^{nd}\}$ candidate clients for {RU 0, RU 1, RU 2, RU 3}. At round N, every RU is assigned to good or normal candidate then the processes will end.

By sorting the plurality of RUs according a descending order of the numbers of candidate clients and then assigning the RU to the client one by one, it will reduce the computation complexity and save computation resources. Without performing the sorting and the one by one process, the RUs assignments need a great amount of computations. By contrast, using the above processes, even in worst case, the calculation amount is $\Pi_1^n(NC_i-(n-1))$, where n represents total RU numbers, and NC represents the number of candidate clients for the $i_{th}$ RU among the total n RUs.

It is to be understood that Table. 1 and Table. 2 are only for the purpose of illustration without suggesting any limitations. The AP 110 may assign any number of RUs to any number of clients. In some implementations, the AP 110 may determine partial of the channel qualities for the clients and for the RUs. The AP 110 may use the partial of the channel qualities to avoid assign a bad RU to a client. The more information of the channel qualities the AP 110 has, the better RU assignment it may achieve. In some corner cases, the AP 110 may not be able to guarantee a good/normal RU to all clients, then the AP 110 may evict the client with the lowest score (that is, with narrow frequency bandwidth and low RSSI). Then, the AP 110 may try to assign a good RU to the client during the next periods.

For simplicity, in the example of Table. 1, every client is allocated with a RU 26. In some example implementations, each client may be required with different RU sizes or frequency bandwidths. For example, if Client 1 and Client 2 are allocated with RU 52 and Client 3 is allocated with RU 26, the assignment process is similar and a little more complex. Particularly, the AP 110 may determine two tables, one is per-RU 26 (similar to Table 1), another is per-RU 52 (similar to Table 1, but the RU size may be represented by the value of 2). Then, the AP 110 may start to assign RUs for clients requesting a largest RU size. In this example, the AP 110 may start to assign RUs for Client 1 and Client 2 using a procedure similar to the above described procedure. After Client 1 and Client 2 are both assigned with a good or normal RU, the AP 110 may assign RU for client requesting less RU size. In this example, the AP 110 may assign RU for Client 3 which requesting a RU 26.

Figure 6:
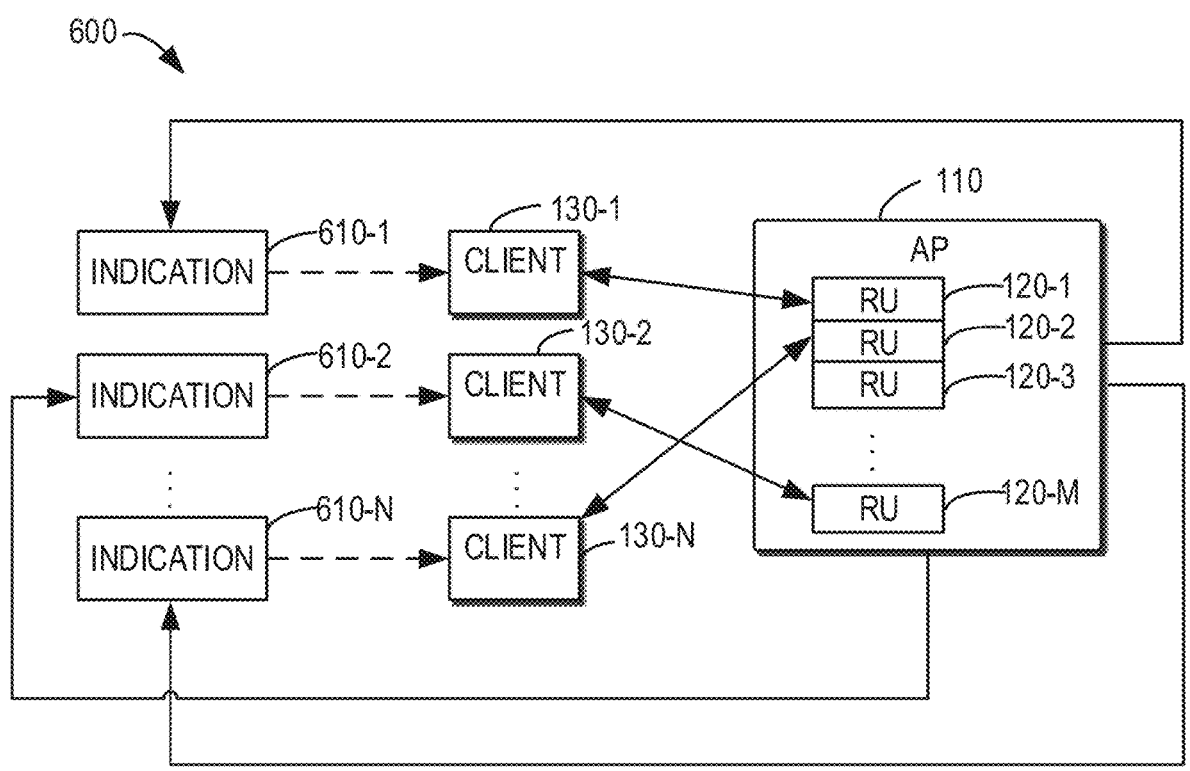
FIG. 6 illustrates an example RU assignment for a plurality clients in accordance with some example implementations of the present disclosure.

FIG. 6 illustrates an example RU assignment 600 for the plurality clients 130 in accordance with some example implementations of the present disclosure. For the purpose of discussion, the example RU assignment 600 will be described with reference to FIG. 1. After performing RU assignment such as using method 500 for the plurality of clients 130, the AP 110 may determine RU 120-1 as the target RU for client 130-1, determine RU 120-M as the target RU for client 130-2, . . . , and determine RU 120-2 as the target RU for client 130-N. Then, the AP 110 may transmit a following transmission to the client 130 using the corresponding target RU 120. In addition, the AP 110 may transmit indication information 610-1, 610-2, . . . , and 610-N to the clients 130-1, 130-2, . . . , and 130-N, respectively. The indication information 610-1, 610-2, . . . , and 610-N may be collectively referred to as "indication information 610" or individually referred to as "indication information 610". The indication information 610 may indicate the target RU for each client 130. After receiving the indication information 610, the client 130 may transmit a following transmission to the AP 110 using the target RU indicated by the indication information 610. One or more following transmission may be performed between the AP 110 and the client 130 using the corresponding target RU 120.

By performing the RU assignment described with respect to FIGS. 5-6, the AP may map RU to proper subcarriers from the perspective and frequency preference of each client. Through overall assignment, it may ensure that each client is assigned with a RU with a good or normal channel quality. That is, it may avoid a bad RU to be assigned to a client, thus avoid the potential transmission error. Such scientifically and reasonable assignment may ensure better resource utilization efficiency.

In addition, by assigning the plurality of RUs to the plurality of clients, it may avoid the clients to content for a RU for transmission. In the cases that each client has multiple options, the process may take into full consideration of the channel qualities for each clients, and find a finally assignment option which may ensure the transmission performance for every client. Through this win-win assignment, the system performance and reliability will be improved.

Figure 7:
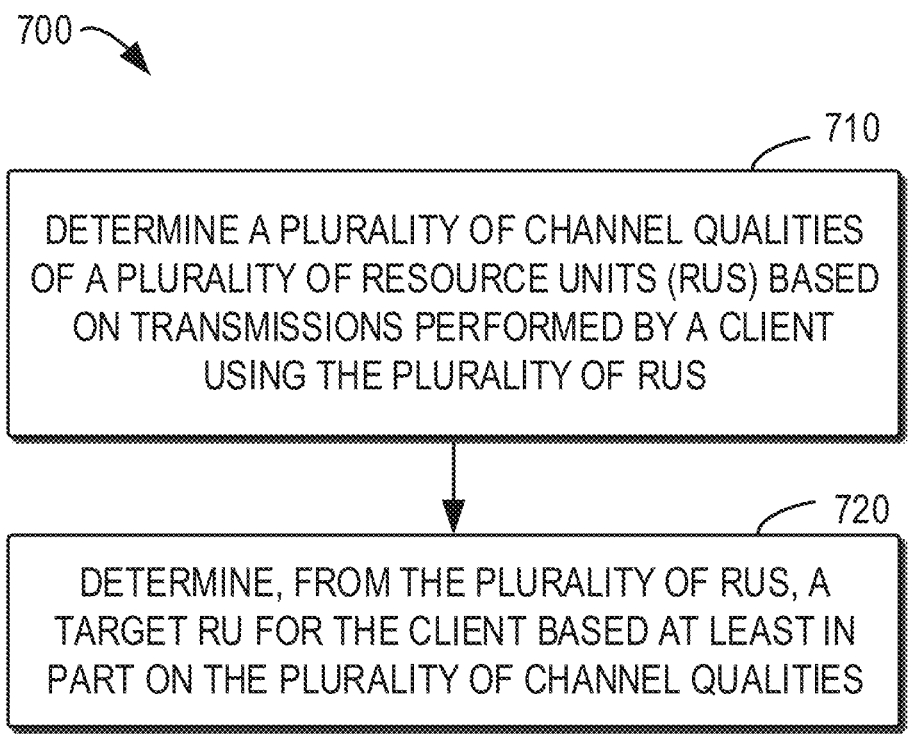
FIG. 7 illustrates a flowchart of a method in accordance with some example implementations of the present disclosure.

FIG. 7 illustrates a flowchart of a method 700 in accordance with some example implementations of the present disclosure. The method 700 can be carried out by the AP 110 according to the implementations described herein. While only some blocks are shown in the method 700, the method 700 may comprise other operations described herein.

At 710, the AP 110 determines a plurality of channel qualities of a plurality of RUs for a client. The plurality of RUs are configured to be available for communications with a plurality of clients comprising the client. In some example implementations, in determining the plurality of channel qualities, the AP 110 may receive information indicating the plurality of channel qualities from the client, wherein the channel quality information is determined based on historical transmissions performed by the client using the plurality of RUs. In some example implementations, in determining the plurality of channel qualities, the AP 110 may transmit a trigger frame to the client using the plurality of RUs; detect an energy distribution over the plurality of RUs during reception of a response frame to the trigger frame transmitted by the client using the plurality of RUs, and determine the plurality of channel qualities based on the energy distribution over the plurality of RUs.

At 720, the AP 110 determines, from the plurality of RUs, a target RU for the client based at least in part on the plurality of channel qualities. In some example implementations, in determining a target RU for the client, the AP 110 may determine, from the plurality of RUs, a target RU for the client based on comparisons between the plurality of channel qualities and a threshold quality set for the client. The target RU is to be used by the AP to perform a transmission with the AP 110. In some example implementations, the threshold quality is determined based on an average channel quality of the plurality of channel qualities.

In some example implementations, the AP 110 may transmit, to the client, indication information indicative of the target RU to be used by the client to transmit a following transmission to the AP 110.

In some example implementations, in determining the target RU for the client based on the comparisons, in accordance with a determination that a single RU of the plurality of RUs has a channel quality exceeding the threshold quality, the AP 110 may determine the single RU to be the target RU for the client. In some example implementations, in determining the target RU for the client based on the comparisons, in accordance with a determination that more than one RU of the plurality of RUs has a channel quality exceeding the threshold quality, the AP 110 may determine a candidate RU set for the client from the more than one RU having the channel quality exceeding the threshold quality, the candidate RU set comprising at least one RU, and select a candidate RU from the candidate RU set as the target RU for the client.

In some example implementations, in determining the candidate RU set, the AP 110 may select at least one of the more than one RU having a frequency bandwidth equal to or exceeding a threshold frequency bandwidth, to form the candidate RU set. In some example implementations, the AP 110 may further receive, from the client, information related to a RU size requirement, the RU size requirement indicating the threshold frequency bandwidth. In some example implementations, in selecting the target RU from the candidate RU set, the AP 110 may determine the number of candidate clients for each RU in the candidate RU set, a respective channel quality of the RU for a candidate client exceeding a threshold quality set for the candidate client; and in accordance with a determination that the number of candidate clients for a particular RU in the set of RUs is less than or equal to the numbers of candidates clients for other RUs in the candidate RU set, the AP 110 may select the particular RU as the target RU for the client.

Figure 8:
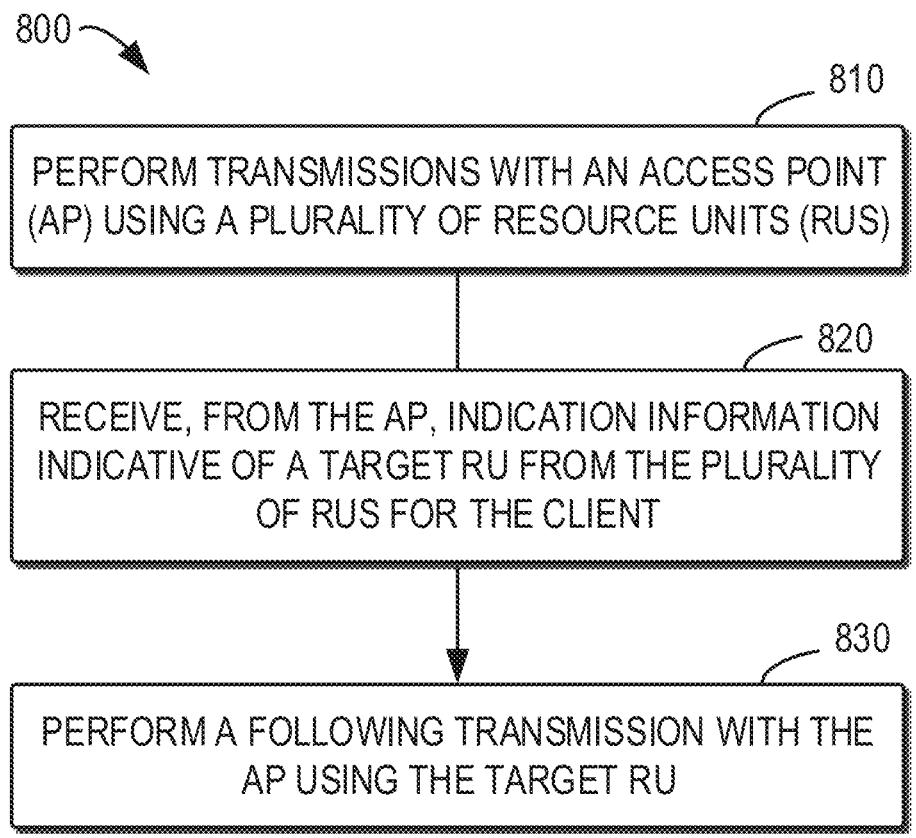
FIG. 8 illustrates another flowchart of a method in accordance with some example implementations of the present disclosure.

FIG. 8 illustrates a flowchart of a method 800 in accordance with some example implementations of the present disclosure. The method 800 can be carried out by the client 130 according to the implementations described herein. While only some blocks are shown in the method 800, the method 800 may comprise other operations described herein.

At 810, the client 130 performs transmissions with an AP using a plurality of RUs. The plurality of RUs are configured to be available for communications with a plurality of clients comprising the client 130. In some example implementations, in performing the transmissions, the client 130 may transmit, to the AP, a response frame to a trigger frame using the plurality of RUs in response to receiving the trigger frame from the AP using the plurality of RUs.

At 820, the client 130 receives, from the AP, indication information indicative of a target RU from the plurality of RUs for the client 130. In some example implementations, the target RU has a channel quality exceeding a threshold quality. The threshold quality is determined based on an average of a plurality of channel qualities of the plurality of RUs for the client. In some example implementations, the target RU has a frequency bandwidth equal to or exceeding a threshold frequency bandwidth.

At block 830, the client performs a following transmission with the AP using the target RU.

In some example implementations, the client 130 may further transmit, to the AP, information related to a RU size requirement. The RU size requirement indicates the threshold frequency bandwidth.

In some example implementations, the client 130 may further determine a plurality of channel qualities of the plurality of RUs based on the transmissions performed by the client using the plurality of RUs; and transmit, to the AP, information indicating the plurality of channel qualities.

Figure 9:
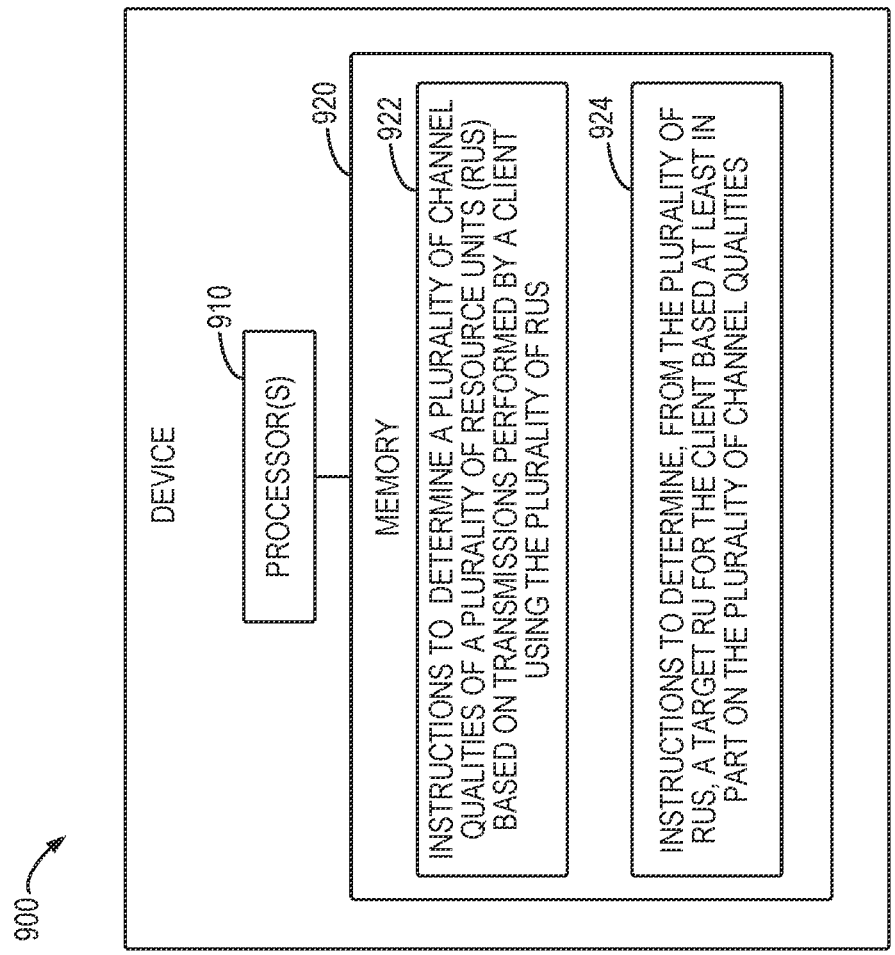
FIG. 9 illustrates a block diagram of a communication device in accordance with some example implementations of the present disclosure.

FIG. 9 illustrates a block diagram of an example device 900 in accordance with some example implementations of the present disclosure. The device 900 comprises at least one processor 910 and a memory 920 coupled to the at least one processor 910. The memory 920 stores instructions to cause the at least one processor 910 to implement acts of a method.

As illustrated in FIG. 9, the memory 920 stores instructions 922 to determine a plurality of channel qualities of a plurality of RUs for a client. The plurality of RUs are configured to be available for communications with a plurality of clients comprising the client.

In some example implementations, the instructions 922 to determine the plurality of channel qualities of the plurality of RUs for the client comprises instructions to, receive information indicating the plurality of channel qualities from the client. The channel quality information is determined based on historical transmissions performed by the client using the plurality of RUs.

In some example implementations, the instructions 922 to determine the plurality of channel qualities of the plurality of RUs for the client comprises instructions to, in determining the plurality of channel qualities, transmit a trigger frame to the client using the plurality of RUs; detect an energy distribution over the plurality of RUs during reception of a response frame to the trigger frame transmitted by the client using the plurality of RUs, and determine the plurality of channel qualities based on the energy distribution over the plurality of RUs.

The memory 920 further stores instructions 924 to determine, from the plurality of RUs, a target RU for the client based at least in part on the plurality of channel qualities. In some example implementations, the instructions 924 to determine the target RU comprises instructions to determine, from the plurality of RUs, a target RU for the client based on comparisons between the plurality of channel qualities and a threshold quality set for the client. The target RU is to be used by the client for a following transmission with the device 900.

In some example implementations, the memory 920 further stores instructions to transmit, to the client, indication information indicative of the target RU to be used by the client to transmit a following transmission to the device 900.

In some example implementations, the threshold quality is determined based on an average channel quality of the plurality of channel qualities.

In some example implementations, the instructions to determine the target RU based on the comparisons comprises instructions to in accordance with a determination that a single RU of the plurality of RUs has a channel quality exceeding the threshold quality, determine the single RU to be the target RU for the client. In some example implementations, the instructions to determine the target RU based on the comparisons comprises instructions to in accordance with a determination that more than one RU of the plurality of RUs has a channel quality exceeding the threshold quality, determine a candidate RU set for the client from the more than one RU having the channel quality exceeding the threshold quality, the candidate RU set comprising at least one RU, and select a candidate RU from the candidate RU set as the target RU for the client.

In some example implementations, the instructions to determine the candidate RU set comprises instructions to select at least one of the more than one RU having a frequency bandwidth equal to or exceeding a threshold frequency bandwidth, to form the candidate RU set. In some example implementations, the memory 920 further stores instructions to receive, from the client, information related to a RU size requirement, the RU size requirement indicating the threshold frequency bandwidth. In some example implementations, the instructions to select the target RU from the candidate RU set comprises instructions to determine the number of candidate clients for each RU in the candidate RU set, a respective channel quality of the RU for a candidate client exceeding a threshold quality set for the candidate client; and in accordance with a determination that the number of candidate clients for a particular RU in the set of RUs is less than or equal to the numbers of candidates clients for other RUs in the candidate RU set, select the particular RU as the target RU for the client.

Figure 10:
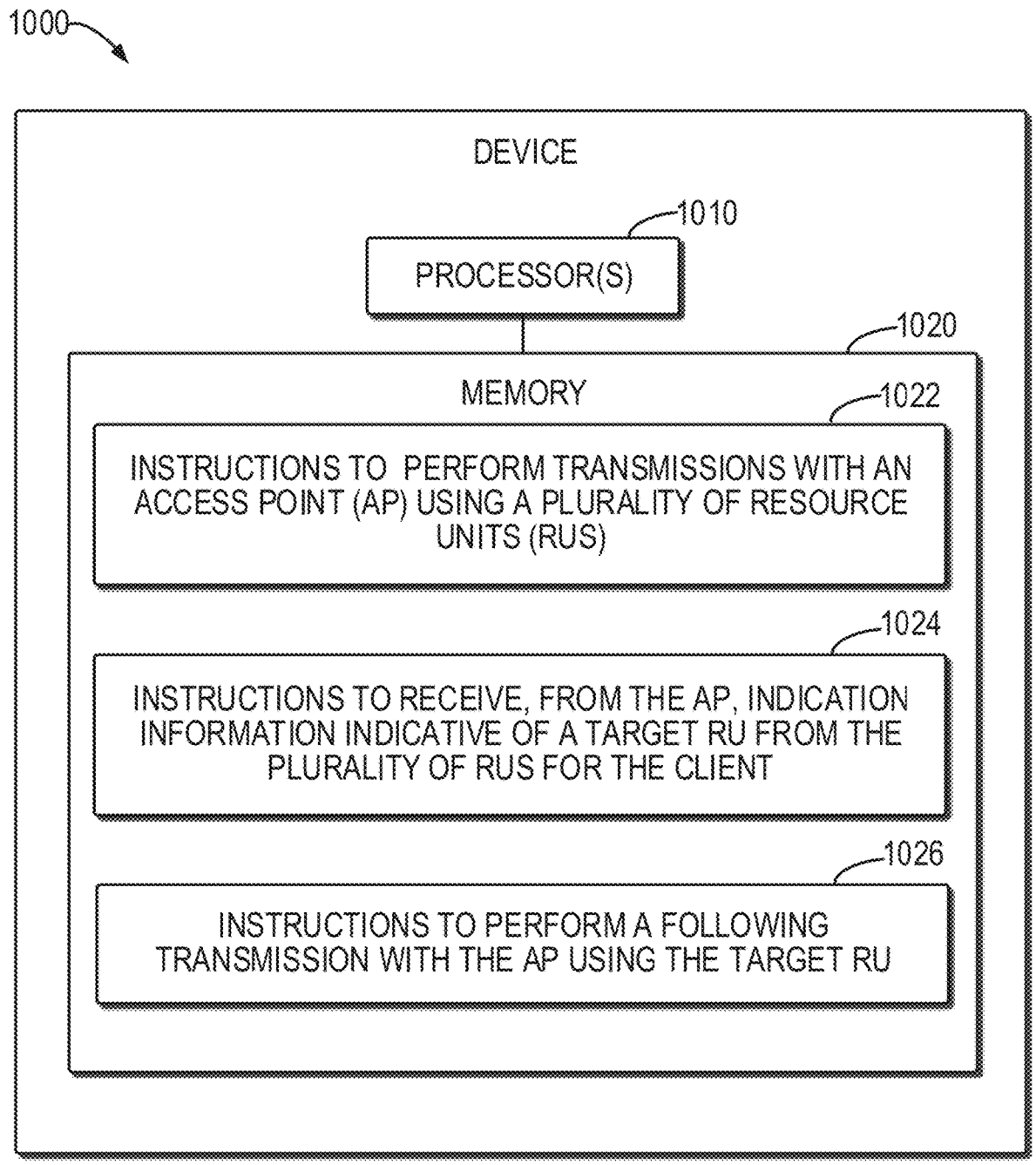
FIG. 10 illustrates another block diagram of a communication device in accordance with some example implementations of the present disclosure.

FIG. 10 illustrates a block diagram of an example device 1000 in accordance with some example implementations of the present disclosure. The device 1000 comprises at least one processor 1010 and a memory 1020 coupled to the at least one processor 1010. The memory 1020 stores instructions to cause the at least one processor 1010 to implement acts of a method.

As illustrated in FIG. 10, the memory 1020 stores instructions 1022 to perform transmissions with an AP using a plurality of RUs. The plurality of RUs are configured to be available for communications with a plurality of clients comprising the device 1000. In some example implementations, the instructions 1022 to perform transmissions comprises instructions to transmit, to the AP, a response frame to a trigger frame using the plurality of RUs in response to receiving the trigger frame from the AP using the plurality of RUs.

The memory 1020 further stores instructions 1024 to receive, from the AP, indication information indicative of a target RU from the plurality of RUs for the device 1000. In some example implementations, the target RU has a channel quality exceeding a threshold quality. The threshold quality is determined based on an average of a plurality of channel qualities of the plurality of RUs for the client. In some example implementations, the target RU has a frequency bandwidth equal to or exceeding a threshold frequency bandwidth.

The memory 1020 further stores instructions 1026 to perform a following transmission with the AP using the target RU.

In some example implementations, the memory 1020 further stores instructions to transmit, to the AP, information related to a RU size requirement. The RU size requirement indicates the threshold frequency bandwidth.

In some example implementations, the memory 1020 further stores instructions to determine a plurality of channel qualities of the plurality of RUs based on the transmissions performed by the device 1000 using the plurality of RUs; and transmit, to the AP, information indicating the plurality of channel qualities.

The present disclosure also provides at least one computer program product tangibly stored on a non-transitory computer-readable storage medium. The computer program product includes program codes or instructions which can be executed to carry out the method as described above with reference to FIG. 7 and/or the method as described above with reference to FIG. 8.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
    determining, at an access point (AP), a plurality of channel qualities of a plurality of resource units (RUs) for a client, the plurality of RUs being configured to be available for communications with a plurality of clients comprising the client;
    determining, from the plurality of RUs, a target RU for the client based on comparisons between the plurality of channel qualities and a threshold quality set for the client buff:

in accordance with a determination that more than one RU of the plurality of RUs has a channel quality exceeding the threshold quality, determining a candidate RU set for the client from the more than one RU having the channel quality exceeding the threshold quality, the candidate RU set comprising at least one RU; and selecting a candidate RU from the candidate RU set as the target RU for the client by determining the number of candidate clients for each RU in the candidate RU set, a respective channel quality of the RU for a candidate client exceeding a threshold quality set for the candidate client; and in accordance with a determination that the number of candidate clients for a particular RU in the candidate RU set is less than or equal to the numbers of candidate clients for other RUs in the candidate RU set, selecting the particular RU as the target RU for the client;

wherein the target RU is to be used by the client for a following transmission with the AP.

2. The method of claim 1, wherein the threshold quality is determined based on an average channel quality of the plurality of channel qualities.

3. The method of claim 1, wherein determining the target RU for the client based on the comparisons comprises: in accordance with a determination that a single RU of the plurality of RUs has a channel quality exceeding the threshold quality, determining the single RU to be the target RU for the client.

4. The method of claim 1, wherein determining the candidate RU set comprises:
selecting at least one of the more than one RU having a frequency bandwidth equal to or exceeding a threshold frequency bandwidth, to form the candidate RU set.

5. The method of claim 4, further comprising:
receiving, from the client, information related to a RU size requirement, the RU size requirement indicating the threshold frequency bandwidth.

6. The method of claim 1, wherein determining the plurality of channel qualities comprises:
receiving information indicating the plurality of channel qualities from the client, wherein channel quality information is determined based on historical transmissions performed by the client using the plurality of RUs.

7. The method of claim 1, wherein determining the plurality of channel qualities comprises:
transmitting a trigger frame to the client using the plurality of RUs;
detecting an energy distribution over the plurality of RUs during reception of a response frame to the trigger frame transmitted by the client using the plurality of RUs, and
determining the plurality of channel qualities based on the energy distribution over the plurality of RUs.

8. The method of claim 1, further comprising:
transmitting, to the client, indication information indicative of the target RU to be used by the client to transmit a following transmission to the AP.

9. The method of claim 1, wherein the plurality of RUs comprises a group of subcarriers.

10. The method of claim 1, wherein the AP periodically determines at least one of the plurality of channel qualities and the target RU.

11. A method comprising:
performing, at a client, transmissions with an access point (AP) using a plurality of resource units (RUs), the plurality of RUs configured to be available for communications with a plurality of clients comprising the client;

receiving, from the AP, indication information indicative of a target RU from the plurality of RUs for the client based on comparisons between a plurality of channel qualities of the plurality of RUs and a threshold quality set for the client;

wherein according to a determination that more than one RU of the plurality of RUs has a channel quality exceeding the threshold quality, a candidate RU set is determined for the client from the more than one RU having the channel quality exceeding the threshold quality, the candidate RU set comprising at least one RU;

wherein a candidate RU is selected from the candidate RU set as the target RU for the client by determining the number of candidate clients for each RU in the candidate RU set, a respective channel quality of the RU for a candidate client exceeding the threshold quality set for the candidate client; and wherein according to a determination that the number of candidate clients for a particular RU in the candidate RU set is less than or equal to the numbers of candidates clients for other RUs in the candidate RU set, the particular RU is selected as the target RU for the client; and performing a following transmission with the AP using the target RU.

12. The method of claim 11, wherein the target RU has a channel quality exceeding a threshold quality, and
wherein the threshold quality is determined based on an average of a plurality of channel qualities of the plurality of RUs for the client.

13. The method of claim 11, wherein the target RU has a frequency bandwidth equal to or exceeding a threshold frequency bandwidth.

14. The method of claim 11, further comprising:
transmitting, to the AP, information related to a RU size requirement, the RU size requirement indicating the threshold frequency bandwidth,
wherein the target RU has a frequency bandwidth equal to or exceeding the frequency bandwidth.

15. The method of claim 11, further comprising:
determining a plurality of channel qualities of the plurality of RUs based on the transmissions performed by the client using the plurality of RUs; and
transmitting, to the AP, information indicating the plurality of channel qualities.

16. The method of claim 11, wherein performing the transmissions comprises:
in response to receiving a trigger frame from the AP using the plurality of RUs, transmitting, to the AP, a response frame to the trigger frame using the plurality of RUs.

17. A communication device comprising:
at least one processor; and
a memory coupled to the at least one processor, the memory storing instructions to cause the at least one processor to implement acts comprising:
determining a plurality of channel qualities of a plurality of resource units (RUs) for a client, the plurality of RUs being configured to be available for communications with the client and at least one further client; and
determining, from the plurality of RUs, a target RU for the client based on comparisons between the plurality of channel qualities and a threshold quality set for the client and the at least one further client by:

in accordance with a determination that more than one RU of the plurality of RUs has a channel quality exceeding the threshold quality, determining a candidate RU set for the client and the at least one further client from the more than one RU having the channel quality exceeding the threshold quality, the candidate RU set comprising at least one RU; and selecting a candidate RU from the candidate RU set as the target RU for the client and the at least one further client by determining the number of candidate clients for each RU in the candidate RU set, a respective channel quality of the RU for a candidate client exceeding a threshold quality set for the candidate client; and in accordance with a determination that the number of candidate clients for a particular RU in the candidate RU set is less than or equal to the numbers of candidate clients for other RUs in the candidate RU set, selecting the particular RU as the target RU for the client and the at least one further client, the target RU having a channel quality higher than a threshold quality set for the client and the at least one further client, wherein the target RU is to be used by the client and the at least one further client for a following transmission with the communication device.

18. The communication device of claim 17, wherein the threshold quality is determined based on an average channel quality of the plurality of channel qualities.

19. The communication device of claim 17, wherein the acts further comprises:

receiving, from the client, information related to a RU size requirement, the RU size requirement indicating the threshold frequency bandwidth.

20. The communication device of claim 17, wherein determining the plurality of channel qualities comprises:

transmitting a trigger frame to the client using the plurality of RUs;

detecting an energy distribution over the plurality of RUs during reception of a response frame to the trigger frame transmitted by the client using the plurality of RUs, and determining the plurality of channel qualities based on the energy distribution over the plurality of RUs.

* * * * *